Patented Feb. 3, 1953

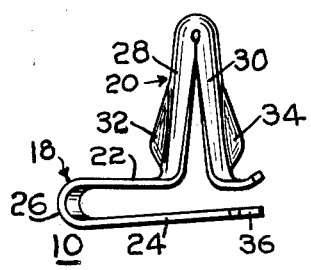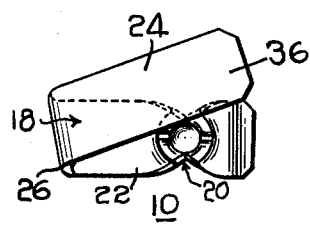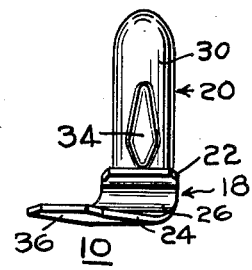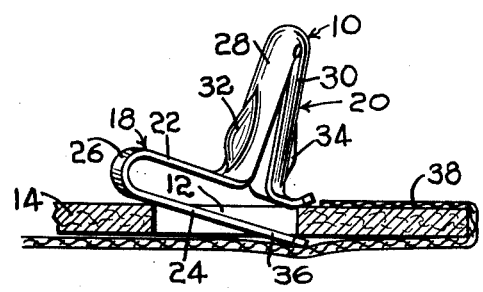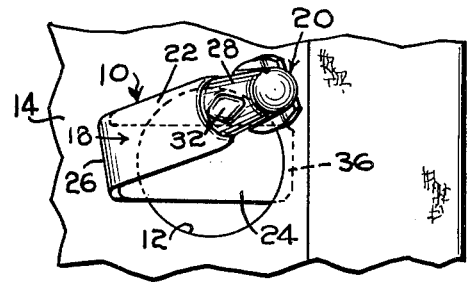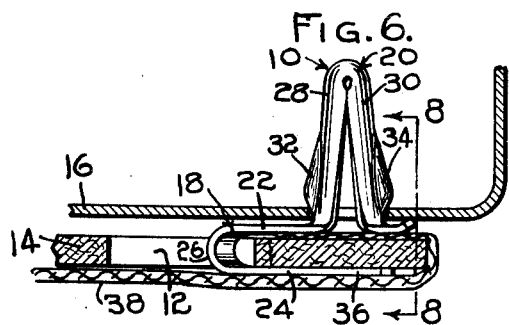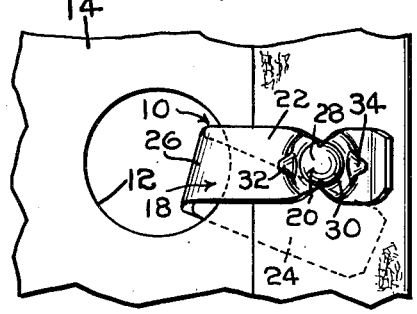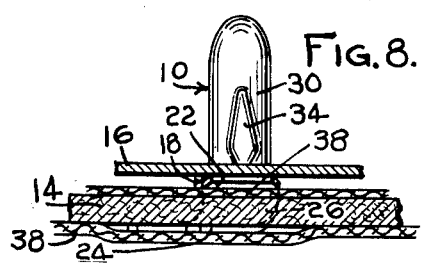

2,627,094

UNITED STATES PATENT OFFICE 2,627,094

FASTENING DEVICE

William A. Bedford, Jr., North Scituate, Mass., assignor to United-Carr Fastener Corporation, Cambridge, Mass., a corporation of Massachusetts Application July 19, 1951, Serial No. 237,552

4 Claims. (Cl. 24—73)

This invention relates generally to fastening devices, and has particular reference to a one-piece sheet metal fastening device for assembly into a panel opening to enable the panel to be snapped into engagement with a support.

In the assembly of certain portions of automobiles, such as inside panels for doors and the like, a panel formed of cardboard or similar material, covered with decorative cloth, must be secured to suitable supporting means on the door. Since access must be available to the interior mechanism of the door for repair work, such panels must also be readily removable. It has been customary to provide apertures near the edge of the panel, to receive a fastener having a U-shaped panel-engaging portion to straddle the panel and a support-engaging snap fastener portion extending upwardly therefrom normal to the panel. The construction of the support usually requires that the snap fastener portion of the fastener be disposed as near the edge of the panel as possible, and the composition of the panel requires that the apertures therein be spaced inwardly from the edge so that the fastener will not pull through the panel. The fastener must have a lower leg with broad bearing surface to be disposed below the panel, and yet must be capable of assembly through a relatively small aperture, and no portion of the fastener can protrude beyond the edge of the panel. The fastener must also be capable of rapid assembly.

Since such fasteners must be assembled by entering one leg of the U-shaped panel-engaging portion into the aperture, it has not been feasible to have the legs initially inclined toward each other, to grip the panel after assembly, since such construction would make it difficult or impossible to start the end of the leg into the opening. Hence, embossed portions or raised tongues have been provided on the lower leg to provide such gripping action. However, such construction results in an undesirable bump in the portion of the decorative cloth disposed over the lower leg of the fastener.

The object of the invention is to provide a panel fastener having a generally U-shaped panel-engaging portion with support-engaging means disposed thereon, in which opposing portions of the panel-engaging portion are arranged to permit easy assembly of the fastener with the panel.

Another object of the invention is to provide a panel fastener having a U-shaped panel-engaging portion formed by spaced legs, in which a support-engaging snap fastener portion is disposed on one leg, and the other leg has a free end portion laterally offset therefrom to facilitate insertion of said other leg into a panel opening.

Other objects of the invention will, in part, be obvious, and will, in part, appear hereinafter.

In the drawing:

Fig. 1 is a view in side elevation of a panel fastener embodying the features of the invention;

Fig. 2 is a bottom plan view of the fastener of Fig. 1;

Fig. 3 is a view of the fastener of Fig. 1 as seen from the right side;

Fig. 4 is a view in side elevation illustrating the method of assembly of the panel fastener into a panel opening;

Fig. 5 is a view of the assembly operation of Fig. 4 as seen from the top;

Fig. 6 is a view in side elevation of the panel fastener completely assembled with the panel and a support;

Fig. 7 is a top plan view of Fig. 6 with the support member omitted; and

Fig. 8 is a view of Fig. 6 as seen from the right side.

Referring to the drawing, there is illustrated a panel fastener 10, which is adapted for assembly into an opening 12 in a panel 14, to enable the panel to be snapped into engagement with a support 16.

The fastener 10 is preferably formed of a single piece of flat sheet metal strip, bent to form a panel-engaging portion 18 and a support-engaging portion 20. The panel-engaging portion 18 comprises a pair of legs 22 and 24 which have their flat sides opposing and are joined at one end by a reverse bend portion 26 so that the legs are disposed in substantially parallel planes and are spaced apart a distance substantially equal to the thickness of the panel onto which the fastener is to be assembled. The term "substantially parallel" as used herein is meant to include legs which may be slightly inclined in relation to each other as illustrated in Fig. 1, for a purpose to appear hereinafter. The support-engaging portion 20 is integral with the end of the leg 22 and comprises a pair of relatively yieldable channel-shaped snap fastener legs 28 and 30 which are joined at the upper end, and are provided with outwardly embossed shoulder portions 32 and 34 for snap fastener engagement with the support 16. The lower end of the snap fastener leg is integral with the end of the panel-engaging leg 20, and the opposing snap fastener leg 30 terminates in a free end.

To facilitate assembly of the fastener with the panel 14, the lower panel-engaging leg 24 is disposed at an acute angle to the upper leg 22, so that the free end 36 of the lower leg 24 is laterally offset from the corresponding end of the upper leg 22.

The method of assembly of the fastener with the panel is illustrated in Figs. 4 and 5. The free end 36 is inserted into opening 12 in the panel, which may be easily accomplished since the end of the other arm is laterally offset and does not engage the upper surface of the panel until the free end has passed under the lower surface of the panel. Thereafter the fastener may be pushed toward the outer edge of the panel so that the entire leg 24 passes under the panel, and the reverse bend portion 26 bears against the wall of the opening to limit the distance the fastener can move toward said outer edge. Since the end of the lower leg 24 is offset from the corresponding portion of the upper leg, the lower leg may be initially inclined slightly upwardly toward the upper leg, so that the legs must be sprung apart to straddle the panel. This enables the legs to firmly grip the panel without the necessity of providing tongues or embossments on the lower leg, and thereby allows the lower leg to lie as flat as possible against the panel so that the portion of the cloth covering 38 disposed over the lower leg is raised as little as possible.

After such assembly, the panel may be mounted onto the support 16 by snapping the support-engaging portion 20 into suitable openings in the support.

Although in the illustrated embodiment the lower leg 24 is disposed at an angle to the upper leg to provide the offset free end 36, it will be understood that in some cases the lower leg may extend in the same direction as the upper leg throughout the major portion of its length, and the offset end may be provided by an angular end portion. In some cases the ends of both the upper and lower legs may be offset in opposite directions.

Since certain other obvious modifications may be made in the device without departing from the scope of the invention, it is intended that all matter contained herein be interpreted in an illustrative and not in a limiting sense.

I claim:

1. A fastening device for assembly into a panel opening to enable the panel to be assembled onto a support, said fastener having a panel-engaging portion comprising a pair of legs formed of a flat strip of sheet metal bent into generally a U-shape so that said legs are joined at one end and are disposed in spaced planes which are substantially parallel, and a support-engaging member formed in one of the legs, the other leg being disposed at an acute angle to said one leg so that the free end portion thereof is laterally offset from the corresponding end of said one leg to facilitate insertion of said other leg into a panel opening.

2. A fastening device for assembly into a panel opening to enable the panel to be assembled onto a support, said fastener having a panel-engaging portion comprising a pair of legs formed of a flat strip of sheet metal bent generally into a U-shape to form a pair of spaced legs having their flat sides opposing, said legs being joined at one end and being disposed in substantially parallel spaced planes, one of said legs having an upstanding snap fastener member formed therein near the other end, the other leg extending at an acute angle to said one leg to terminate in a free end disposed in lateral spaced relation to the corresponding end of said one leg.

3. A fastening device for assembly into a panel opening to enable the panel to be assembled onto a support, said fastener having a panel-engaging portion comprising a pair of legs formed of a flat strip of sheet metal bent generally into a U-shape to form a pair of spaced legs having their flat sides opposing, said legs being joined at one end and being disposed in substantially parallel spaced planes, one of said legs having an integral upwardly extending snap fastener portion disposed thereon comprising a pair of relatively yieldable snap fastener legs having shoulders formed thereon for engagement in an opening in which the panel is to be attached, said snap fastener legs being joined at the upper ends, the lower end of one of said snap fastener legs being integral with and an extension of said one leg of the panel-engaging portion, the other snap fastener leg terminating in a free end portion.

4. A fastening device for assembly into a panel opening to enable the panel to be assembled onto a support, said fastener comprising a pair of legs forming a generally U-shaped panel-engaging portion, said legs being joined at one end and being disposed in spaced relation to grip the panel on opposite sides, and a support-engaging member disposed on one of the legs, the other leg being disposed at an acute angle to said one leg so that the free end portion thereof is laterally offset from the corresponding end portion of said one leg to facilitate insertion of said other leg into a panel opening.

WILLIAM A. BEDFORD, Jr.

REFERENCES CITED

The following references are of record in the file of this patent:

UNITED STATES PATENTS

| Number | Name | Date |
|---|---|---|
| 752,185 | Sibley | Feb. 16, 1904 |
| 1,869,997 | Carter | Aug. 2, 1932 |
| 2,147,779 | VanUum | Feb. 21, 1939 |
| 2,345,004 | Place | Mar. 28, 1944 |